US005315826A

United States Patent [19]

Hirata et al.

[11] Patent Number: 5,315,826

[45] Date of Patent: May 31, 1994

[54] HYDRAULIC DRIVE SYSTEM AND DIRECTIONAL CONTROL VALVE

[75] Inventors: Toichi Hirata, Ushiku; Genroku Sugiyama, Ibaraki, both of Japan

[73] Assignee: Hitachi Construction Machinery Co., Inc., Tokyo, Japan

[21] Appl. No.: 890,590

[22] PCT Filed: Nov. 26, 1991

[86] PCT No.: PCT/JP91/01621

§ 371 Date: Jul. 13, 1992

§ 102(e) Date: Jul. 13, 1992

[87] PCT Pub. No.: WO92/09809

PCT Pub. Date: Jun. 11, 1992

[30] Foreign Application Priority Data

Nov. 26, 1990 [JP] Japan .................................. 2-318059

[51] Int. Cl.[5] .............................................. F16D 31/02

[52] U.S. Cl. ........................................ 60/422; 60/426; 91/517; 91/532; 91/446

[58] Field of Search .................... 60/422, 426; 91/514, 91/517, 518, 532, 445, 446, 447, 448, 31

[56] References Cited

U.S. PATENT DOCUMENTS 4,361,169 11/1982 Williams .............................. 91/451
4,617,798 10/1986 Krusche et al. ...................... 91/446
4,787,294 11/1988 Bowden ............................... 91/447
4,938,023 7/1990 Yoshino .

FOREIGN PATENT DOCUMENTS 2906670 9/1980 Fed. Rep. of Germany .
57-116965 7/1982 Japan .
60-320412 2/1985 Japan .
2195745 4/1988 United Kingdom .

*Primary Examiner*—Edward K. Look
*Assistant Examiner*—F. David Lopez
*Attorney, Agent, or Firm*—Fay, Sharpe, Beall, Fagan, Minnich & McKee

[57] ABSTRACT

A plurality of directional control valves (5, 6) respectively disposed between a hydraulic pump (50) and a plurality of actuators (3, 4) each comprises a pump port (9), a pressure chamber (10), a feeder passage (11), actuator ports (**12*a*, 12*b*), a reservoir port (13), first meter-in variable restrictors (15*a*, 15*b*) disposed between the pump port and the pressure chamber, and a pressure compensating valve (16) disposed between the pressure chamber and the feeder passage and having a pair of opposite ends, one of which is subjected to a pressure in the pressure chamber and the other of which is subjected to a maximum load pressure among the plurality of actuators. The hydraulic pump (1) includes a pump flow control device (2) for controlling a delivery rate of the hydraulic pump so that a delivery pressure of the hydraulic pump is held higher by a predetermined value than the maximum pressure obtained, as a load sensing pressure, from load pressures of the plurality of actuators. At least one of the plurality of directional control valves has a bleed passage (21) for communicating between the feeder passage (11) and the reservoir port (13), and second variable restrictors (22*a*, 22*b***) disposed in the bleed passage and moved in conjunction with the first meter-in variable restrictors, making it possible to prevent abrupt operation of the actuator adapted for driving an inertial body, and suppress vibration produced in a circuit even when any of the pump delivery rate and the load pressure is fluctuated.

12 Claims, 8 Drawing Sheets

HYDRAULIC DRIVE SYSTEM AND DIRECTIONAL CONTROL VALVE

TECHNICAL FIELD

The present invention relates to a hydraulic drive system and a directional control valve, and more particularly to a hydraulic drive system and a directional control valve for use in construction machines, such as hydraulic excavators, each having a plurality of actuators.

BACKGROUND ART

A hydraulic drive system for use in construction machines such as hydraulic excavators comprises a hydraulic pump, a plurality of hydraulic actuators driven by a hydraulic fluid supplied from the hydraulic pump, and a plurality of directional control valves for controlling respective flow rates of the hydraulic fluid supplied from the hydraulic source to a plurality of actuators.

From the standpoint of reducing energy consumption primarily, it is proposed in a hydraulic drive system of that type to employ a load sensing control technique for controlling a delivery pressure of the hydraulic pump dependent on the load pressure. As examples of such a hydraulic drive system, there are known GB 2,195,745A, DE 2,906,670A1, U.S. Pat. No. 4,939,023, etc. To carry out the load sensing control, those examples of the prior art employ a pump flow controller for controlling a delivery rate of the hydraulic pump so that the delivery pressure of the hydraulic pump is held higher by a fixed value than a maximum load pressure among the plurality of actuators. The plurality of directional control valves each comprises a pump port, a pressure chamber capable of communicating with the pump port, a feeder passage capable of communicating with the pressure chamber, an actuator port capable of communicating with the feeder passage, a reservoir port capable of communicating with the actuator port, a first meter-in variable restrictor disposed between the pump port and the pressure chamber, and a pressure compensating valve having a pair of opposite ends, one of which is subjected to a pressure in the pressure chamber and the other of which is subjected to the maximum load pressure among the plurality of actuators. With the pair of opposite ends respectively subjected to the pressure in the pressure chamber and the maximum load pressure, as mentioned above, the pressure compensating valve serves to control the pressure in the pressure chamber dependent on the maximum load pressure for holding the differential pressure across the meter-in variable restrictor at a fixed value, during the combined operation in which plural actuators are driven simultaneously. The differential pressures across the meter-in variable restrictors of all the directional control valves are thereby made equal to one another so that the flow rate of the hydraulic fluid from the hydraulic pump is distributed in accordance with the ratio of opening area between the variable restrictors to perform the desired combined operation.

Of the prior art, the apparatus disclosed in U.S. Pat. No. 4,939,023 is arranged such that one of the directional control valves comprises a pressure reducing valve disposed between the pressure compensating valve and the actuator port for reducing the pressure of the hydraulic fluid supplied to the associated actuator, a load line for leading out the load pressure via a fixed restrictor, and a proportional pressure relief valve of which relief setting pressure is regulated by a pilot pressure from a control lever unit to limit the pressure in the load line, the pressure in the load line being led to act on a setting sector of the pressure reducing valve to thereby control an outlet pressure of the pressure reducing valve dependent on the setting pressure of the proportional pressure relief valve.

The above examples of the prior art have, however, the following problems.

In the hydraulic drive systems disclosed in the above-cited GB 2,195,745 and DE 2,906,670A1, when a control lever for the directional control valve is manipulated to operate the associated actuator, the hydraulic fluid is momentarily forced to flow at a flow rate corresponding to the resultant opening of the meter-in variable restrictor of the directional control valve. Accordingly, upon the control lever being quickly manipulated, the actuator is abruptly operated. This raises a problem in the case of driving a member of large inertia such as a swing of a hydraulic excavator, for example. More specifically, while the flow rate is abruptly increased upon the control lever of the directional control valve being quickly manipulated, the swing to be driven by a swing motor has large inertia and, therefore, the pressure in the system reaches the relief pressure set for limiting a maximum value of the circuit pressure. In this event, the prior art can no longer effect the pressure control and an acceleration of the swing as an inertial body is maximized, causing an operator to feel a shock. This also practically holds true in the case of traveling, boom-up and so forth other than the swing.

Further, in the aforementioned hydraulic drive system, when a tilting angle of the hydraulic pump is changed to a small extent, the flow rate of the hydraulic fluid delivered from the hydraulic pump is also changed and so is the sensing pressure, i.e., the maximum load pressure. If the amount of such a change is large, the delivery rate of the hydraulic pump is changed again to a large extent, which may cause oscillation in the circuit as a result of repetitions of the above process.

On the other hand, with the prior art disclosed in U.S. Pat. No. 4,939,023, the pressure of the hydraulic fluid supplied to the actuator is reduced in response to the pilot pressure at start-up of the swing, thereby preventing the swing motor from being abruptly operated. Also, even when the delivery rate of the hydraulic pump is slightly fluctuated, the load pressure of the swing motor will not fluctuate, because the setting of the proportional pressure relief valve is fixed and so is the setting of the pressure reducing valve as long as the operation amount of the control lever is kept fixed. It is thus possible to suppress change in the load sensing pressure caused by slight fluctuations in the pump delivery rate. However, this prior art has the following problem.

When the swing starts its inertial rotation after start-up thereof, the load pressure of the swing motor is reduced. If the load pressure lowers below the setting pressure of the pressure reducing valve, the latter valve can no longer effect its function. Under that condition, when the delivery rate of the hydraulic pump is slightly fluctuated as mentioned before, the load pressure of the swing motor is changed and so is the load sensing pressure, which may cause oscillation in the circuit, as with the foregoing prior art.

There is generally such a tendency that when the load pressure is changed so as to increase during the operation of an actuator, vibration of the actuator is damped if the flow rate of the hydraulic fluid supplied to the actuator is reduced, continues if it remains the same, and is brought into oscillation if it is increased. With the prior art disclosed in U.S. Pat. No. 4,939,023, since the proportional relief valve is closed under a condition that the load pressure of the swing motor is reduced below the setting pressure of the pressure reducing valve, no part of the hydraulic fluid passing through the directional control valve is now discharged into a reservoir (tank) via the proportional relief valve. In other words, all of the hydraulic fluid passing through the directional control valve is supplied to the actuator. Further, there is no flow of the hydraulic fluid reaching the load line through the fixed restrictor, the pressure in the load line becomes equal to the load pressure so that the differential pressure across the directional control valve is controlled to be constant as usual through the load sensing control of the hydraulic pump, thus rendering constant the flow rate of the hydraulic fluid passing through the directional control valve. Accordingly, when the load pressure is changed so as to increase during the operation of an actuator as mentioned above, the flow rate of the hydraulic fluid supplied to the actuator remains the same. As a result, load fluctuations will not be damped once occurred, which may impair the working efficiency.

It is an object of the present invention to provide a hydraulic drive system and a directional control valve for use in construction machines, which can realize pressure control while maintaining adequate distribution of flow rates, prevent abrupt operation of an actuator adapted for driving an inertial body, and further suppress vibration produced in a circuit even when any of the pump delivery rate and the load pressure is fluctuated.

DISCLOSURE OF THE INVENTION

To achieve the above object, in accordance with the present invention, there is provided a hydraulic drive system for a construction machine comprising hydraulic pressure supply means; a plurality of actuators driven by a hydraulic fluid supplied from said hydraulic pressure supply means; and a plurality of directional control valves respectively disposed between said hydraulic pressure supply means and said plurality of actuators, and each comprising a pump port, a pressure chamber capable of communicating with said pump port, a feeder passage capable of communicating with said pressure chamber, actuator ports capable of communicating with said feeder passage, a reservoir port capable of communicating with said actuator ports, first meter-in variable restrictors disposed between said pump port and said pressure chamber, and a pressure compensating valve disposed between said pressure chamber and said feeder passage and having a pair of opposite ends, one of which is subjected to a pressure in said pressure chamber and the other of which is subjected to a maximum load pressure among said plurality of actuators, said hydraulic pressure supply means having a hydraulic pump and pump flow control means for controlling a delivery rate of said hydraulic pump so that a delivery pressure of said hydraulic pump is held higher by a predetermined value than the maximum pressure obtained, as a load sensing pressure, from load pressures of said plurality of actuators, wherein at least one of said plurality of directional control valves has a bleed passage for communicating between said feeder passage and said reservoir port, and second variable restrictors disposed in said bleed passage and moved in conjunction with said first meter-in variable restrictors.

Preferably, the second variable restrictors are set such that the opening areas thereof become smaller as opening areas of the first variable restrictors increase.

With the present invention thus arranged, since the directional control valves having associated pressure compensating valves are respectively provided for the actuators, the differential pressures across the first meter-in variable restrictors of the directional control valves are all equal to one another. Accordingly, flow rates of the hydraulic fluid supplied to the respective actuators are distributed in accordance with the ratio of opening area between the associated variable restrictors, so that the combined operation can be performed as usual. Also, when driving the actuator which undergoes a load of large inertia, a part of the hydraulic fluid within the feeder passage is caused to flow into a reservoir via the bleed passage and the second variable restrictor provided in the bleed passage in an appropriate amount. Therefore, a rise in the load pressure is suppressed to prevent abrupt operation of the actuator driving the associated inertial body, whereby the inertial body can be driven smoothly.

Further, even if the flow rate of the hydraulic fluid delivered from the hydraulic pressure supply means is fluctuated to some extent, a part of the delivery flow rate is returned to the reservoir through the bleed passage. Consequently, change in the load sensing pressure incidental to such fluctuations in the delivery flow rate is suppressed to prevent oscillation produced in the circuit.

In addition, when the load pressure is changed so as to increase during operation of the actuator, the flow rate of the hydraulic fluid passing through the directional control valve is controlled by the pump flow control means to be kept constant, while the flow rate of the hydraulic fluid returned to the reservoir via the bleed passage is increased with such a rise in the load pressure. As a result, the flow rate of the hydraulic fluid supplied to the actuator is reduced and thus vibration of the actuator is damped.

Preferably, the directional control valve further comprises a third restrictor disposed in a portion of the bleed passage between the feeder passage and the second variable restrictors, and a signal passage for introducing, as the load sensing pressure, a pressure residing in a portion of the bleed passage between the second variable restrictors and the third restrictor.

With the present invention thus arranged, when the load pressure of the actuator is changed so as to increase, the flow rate of the hydraulic fluid passing through the third restrictor is increased and the pressure drop across the third restrictor is enlarged. On the other hand, the pump control means controls the delivery rate of the hydraulic pump so that the delivery pressure of the hydraulic pump is held higher by a fixed value than the pressure in the portion of the bleed passage between the second variable restrictors and the third restrictor and, therefore, the differential pressure across the first meter-in variable restrictor is reduced. Accordingly, the flow rate of the hydraulic fluid passing through the directional control valve is also reduced. With this decrease in the flow rate of the hydraulic fluid passing through the directional control valve, in addition to an increase in the flow rate of the hydraulic fluid returned to the reservoir via the bleed passage as set forth above, the flow rate of the hydraulic fluid supplied to the actuator is reduced to damp the vibration of the actuator. Moreover, with the provision of the third restrictor, the flow rate of the hydraulic fluid to be returned to the reservoir via the bleed passage is reduced, resulting in the smaller energy loss.

Preferably, the directional control valve further includes a load check valve disposed between a connection point of the feeder passage to the bleed passage and the actuator ports. This prevents the hydraulic fluid from reversely flowing from the actuator ports.

Preferably also, the directional control valve has a spool movable through a stroke dependent on an operation amount, and the first and second variable restrictors are formed on the same spool. By so forming the first and second variable restrictors on the same spool, the abovestated operation can be obtained with a simple structure.

Additionally, to achieve the above object, the present invention also provides the directional control valve arranged as set forth before.

BEST MODE FOR CARRYING OUT THE INVENTION

Hereinafter, embodiments of the present invention will be described with reference to the drawings. To begin with, a first embodiment of the present invention will be explained by referring to FIGS. 1 to 4.

Figure 1:
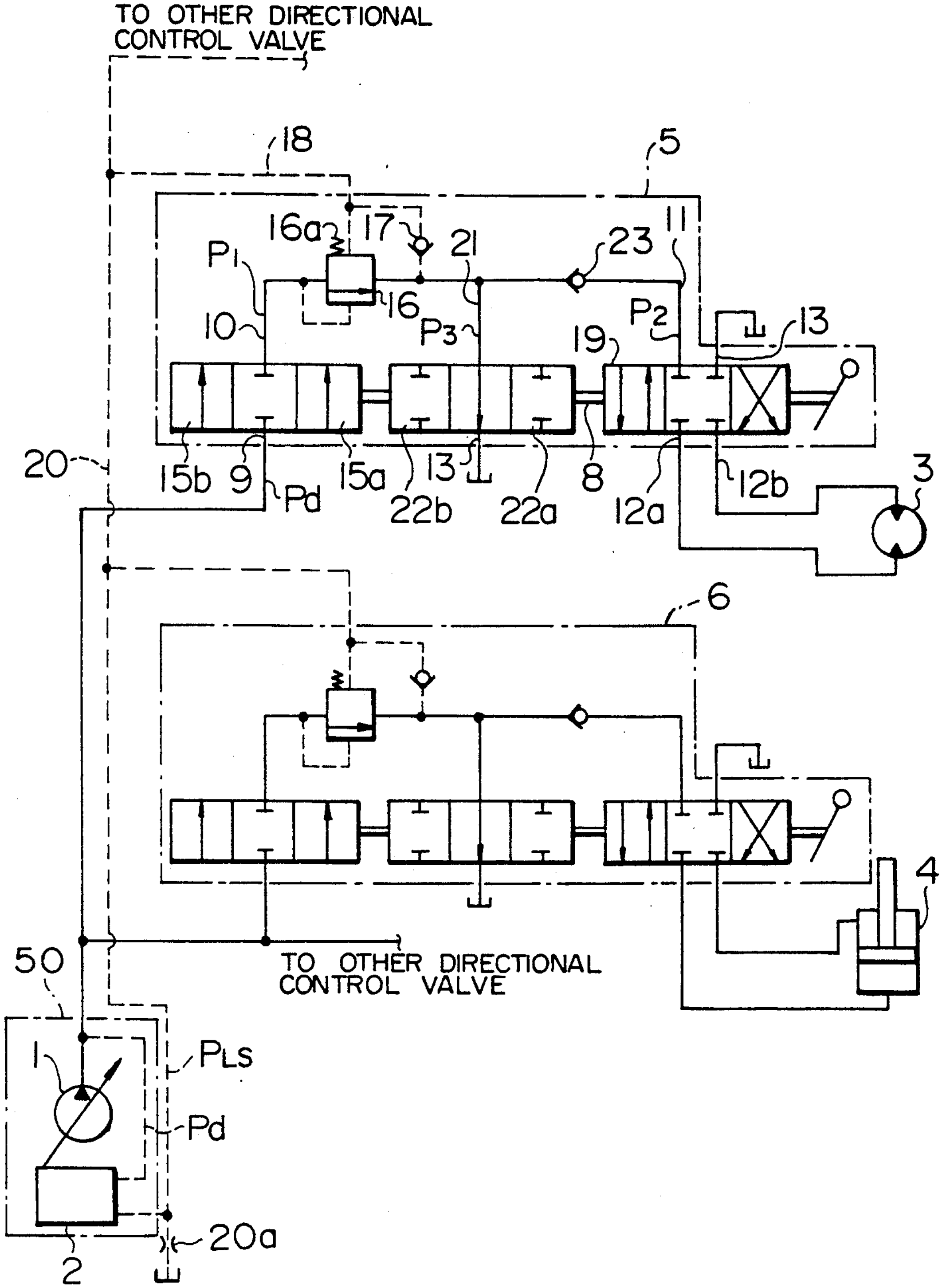
FIG. 1 is a schematic diagram of a hydraulic drive system according to a first embodiment of the present invention.

In FIG. 1, there is shown a hydraulic drive system of this embodiment equipped on hydraulic excavators, for example, that includes a hydraulic pressure supply unit 50 comprising a hydraulic pump 1 of variable displacement type and a pump controller 2 for controlling a displacement volume of the hydraulic pump 1, a plurality of actuators such as a swing motor 3, a boom cylinder 4 and not-shown other excavator components including left and right travel motors, an arm cylinder and a bucket cylinder, and directional control valves 5, 6 and other not-shown circuit components for controlling the flow of hydraulic fluid supplied from the hydraulic pump 1 to the respective actuators such as the swing motor 3 and the boom cylinder 4.

Figure 2:
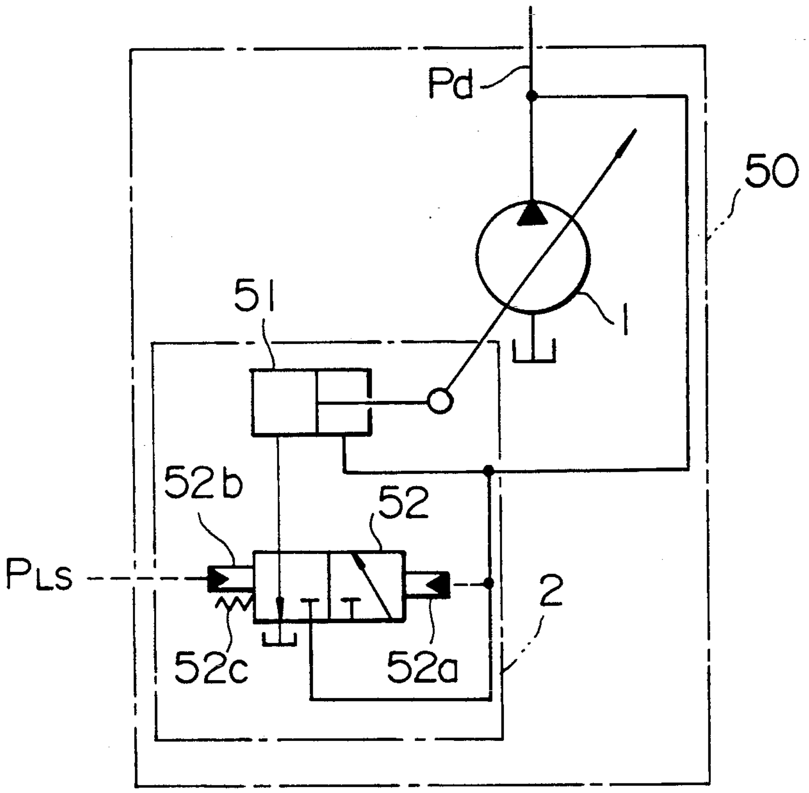
FIG. 2 is a diagram showing details of a pump controller shown in FIG. 1.

The pump controller 2 of the hydraulic pressure supply unit 50 controls a delivery rate of the hydraulic pump 1 so that a differential pressure ΔPLS (=Pd−PLS) between a delivery pressure Pd of the hydraulic pump 1 and a maximum load pressure among the plurality of actuators, i.e., a load sensing pressure PLS (described later) is held at a predetermined value. To this end, as shown in FIG. 2, the pump controller 2 comprises a control actuator 51 for controlling the displacement volume of the hydraulic pump 1, and a flow regulating valve 52 for controlling operation of the control actuator 51. The flow regulating valve 52 is provided at one end thereof with a drive sector 52*a* to which the pump delivery pressure Pd is introduced, and at the other end thereof with both a drive sector 52*b* to which the load sensing pressure PLS is introduced and a spring 52*c* for setting a target differential pressure, thereby controlling the delivery rate of the hydraulic pump 1 so that the force produced by the differential pressure ΔPLS and the force imposed by the spring 52*c* are balanced with each other.

Figure 3:
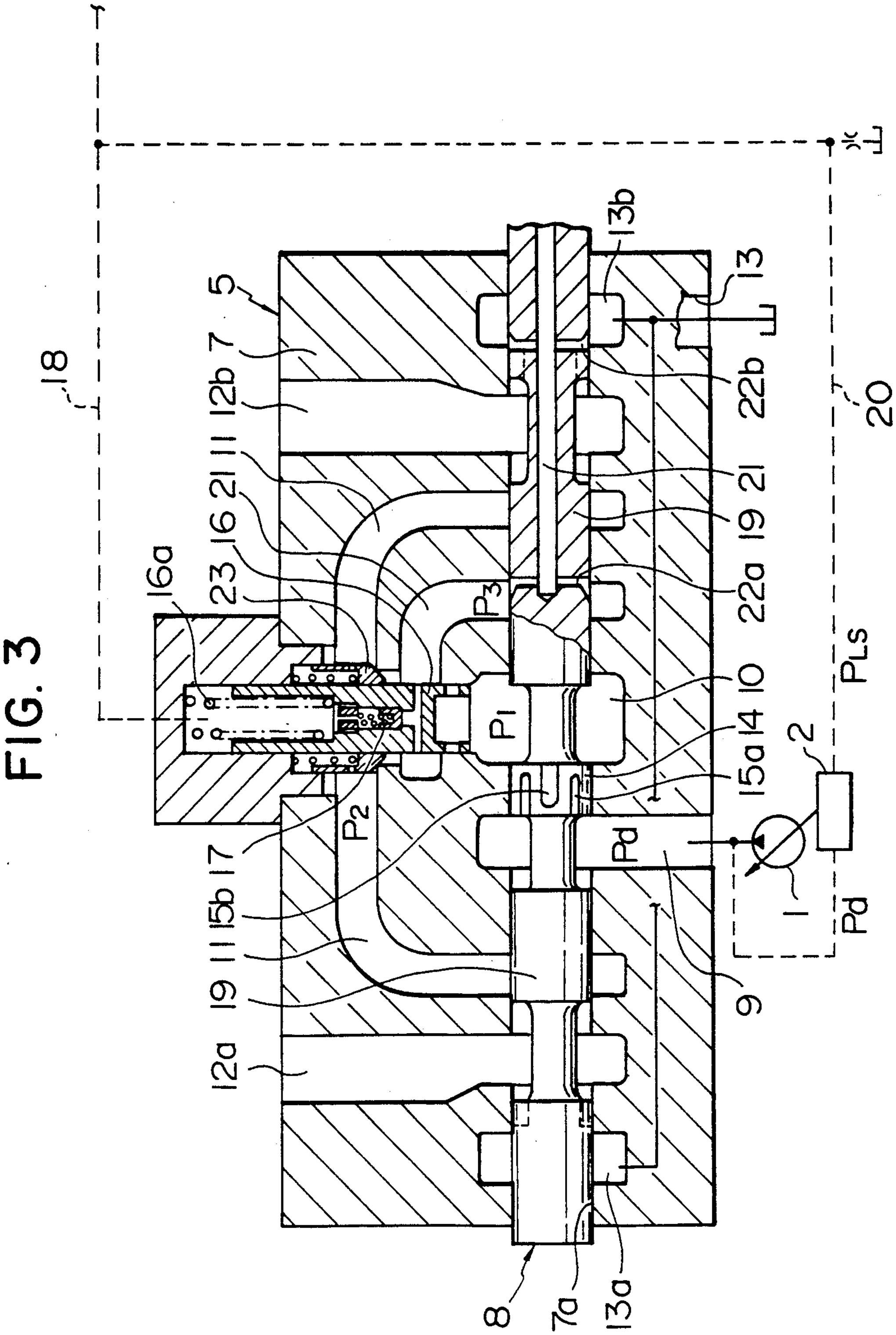
FIG. 3 is a sectional view showing the structure of a directional control valve shown in FIG. 1.

The directional control valves 5, 6 and the other not-shown ones have the same structure. As shown in FIG. 3, the directional control valve 5 for controlling operation of the swing motor 3, by way of example, comprises a block 7 (valve body) and a spool 8 sliding through a bore 7*a* defined in the block 7. The block 7 is formed therein with a pump port 9, a pressure chamber 10 capable of communicating with the pump port 9, a feeder passage 11 capable of communicating with the pressure chamber 10, actuator ports 12*a*, 12*b* capable of communicating with the feeder passage 11, and a reservoir port 13 capable of communicating with the actuator ports 12*a*, 12*b* via respective drain chambers 13*a*, 13*b*. Between the pump port 9 and the pressure chamber 10, there are disposed meter-in variable restrictors 15*a*, 15*b* each comprising a plurality of notches defined in a land 14 of the spool 8. The variable restrictor 15*a* performs its function when the spool 8 is moved to the right in the drawing, whereas the variable restrictor 15*b* performs its function when the spool 8 is moved to the left in the drawing. A pressure compensating valve 16 is disposed between the pressure chamber 10 and the feeder passage 11 and has a pair of opposite ends, one of which is subjected to a pressure P1 in the pressure chamber 10 and the other of which is subjected to the maximum load pressure among the plurality of actuators, i.e., the load sensing pressure PLS, via a check valve 17 provided in the pressure compensating valve 16.

Through functions of the pressure compensating valve 16 and other ones of respective directional control valves associated with the remaining actuators, when the swing motor 3 and the boom cylinder 4 are simultaneously driven, or when the other plural actuators are operated in a combined manner, the pressures P1 in the respective pressure chambers 10 become equal to one another in all of the directional control valves. On the other hand, since all of the directional control valves are connected to the hydraulic pump 1 in parallel, pressures at the respective pump ports 9 are all equal to one another. Accordingly, the respective meter-in variable restrictors 15 of all of the directional control valves have differential pressures across them equal to one another, and flow rates of the hydraulic fluid passing through the variable restrictors 15 are distributed in accordance with the ratio of opening area between the variable restrictors 15.

The feeder passage 11 and the drain chambers 13*a*, 13*b* of the directional control valve 5 are each selectively connected to corresponding one of the actuator ports 12a, 12b upon operation of respective main spool sections 19 provided on the spool 8. More specifically, when the spool 8 is moved to the right in the drawing, the feeder passage 11 is communicated with the actuator port 12a and the actuator port 12b is communicated with the drain chamber 13b. When the spool 8 is moved to the left in the drawing, the feeder passage 11 is communicated with the actuator port 12b and the actuator port 12a is communicated with the drain chamber 13a. The above is also equally applied to the feeder passage, the discharge passage and the actuator port of any other directional control valve. As a result, the hydraulic fluid distributed in a manner as set forth before is supplied to the swing motor 3 and others via the respective actuator ports and then returned back to the reservoir from the swing motor 3 and others, thereby carrying out the desired combined operation.

Figure 4:
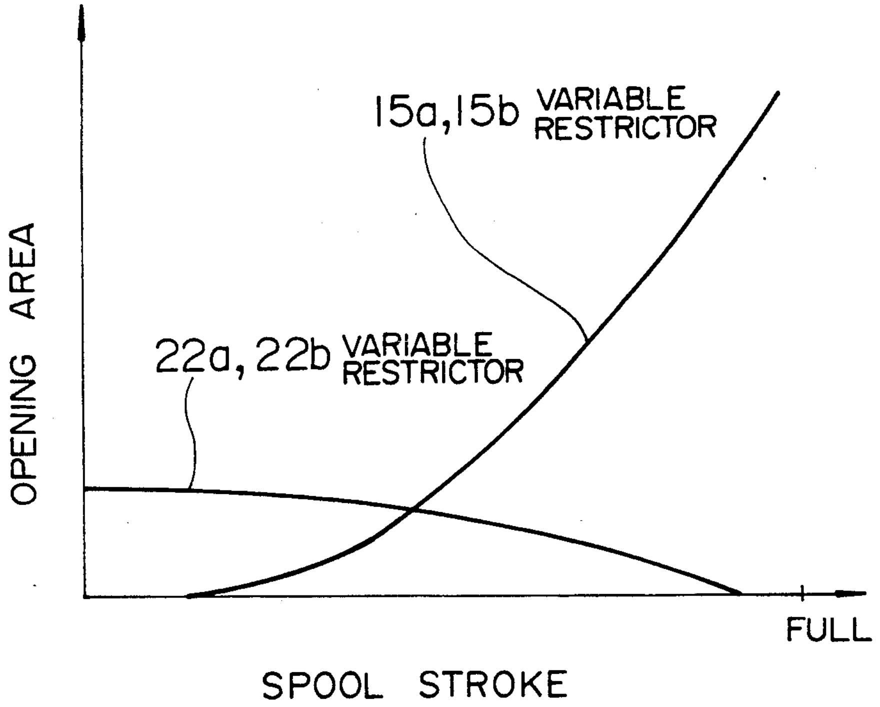
FIG. 4 is a graph showing the relationship in opening area between a meter-in variable restrictor and a variable restrictor in a bleed passage both shown in FIGS. 1 and 3.

Further, the block 7 and the spool 8 are formed therein with a bleed passage 21 capable of communicating between the feeder passage 11 and the reservoir port 13b, and the spool 8 is formed therein with other variable restrictors 22a, 22b movable together with the aforesaid variable restrictors 15a, 15b and located in the bleed passage 21. The variable restrictor 22a performs its function when the spool 8 is moved to the right in the drawing, whereas the variable restrictor 22b performs its function when the spool 8 is moved to the left in the drawing. The relationship in opening area between the variable restrictors 22a, 22b and the meter-in variable restrictors 15a, 15b is set such that, as shown in FIG. 4, as the opening areas of the meter-in variable restrictors 15a, 15b are increased with the spool stroke increasing, the opening areas of the other variable restrictors 22a, 22b become smaller. Additionally, between a branch point of the feeder passage 11 from the bleed passage 21 and the actuator ports 12a, 12b, there is disposed a load check valve 23 adjacent to the pressure compensating valve 16 for preventing a reverse flow of the hydraulic fluid from the pump port 12a or 12b.

The feeder passage 11 is connected to an external signal line 18 via the aforesaid check valve 17 and when to a signal line 20 common to all of the directional control valves, the signal line 20 being led to the aforesaid pump regulator 2. The signal line 20 is also connected to the reservoir via a restrictor 20a for releasing the pressure while the directional control valve is in a neutral state. With such an arrangement, the maximum load pressure among the plurality of actuators is applied as the load sensing pressure PLS to the other end of the pressure compensating valve 16 as set forth before and, at the same time, the load sensing pressure PLS is applied to the pump controller 2. Consequently, the pump controller 2 performs the above-stated control called load sensing control, that is to say, controls the delivery rate of the hydraulic pump 1 so that the pump pressure Pd is held higher by a fixed value than the maximum load pressure PLS.

In this embodiment thus arranged, when the plural directional control valves, e.g., the directional control valves 5, 6, are operated, the flow rates of the hydraulic fluid supplied to the swing motor 3 and the boom cylinder 4 are distributed in accordance with the ratio of opening area between the respective meter-in variable restrictors 15a or 15b as explained above. More specifically, when the directional control valves 5, 6 are operated, the delivery rate of the hydraulic pump 1 is controlled by the pump controller 2 so that the pump pressure Pd is held higher by a fixed value than the load sensing pressure, i.e., the maximum load pressure PLS. The hydraulic fluid delivered from the hydraulic pump 1 passes through the respective variable restrictors 15a or 15b of the directional control valves 5, 6, following which it is led to the pressure chambers 10 and, subsequently, therefrom to the feeder passages 11 via the pressure compensating valves 16. The respective pressure compensating valves 16 have first ends to which the pressure P1 in the pressure chambers 10 is applied, and second ends to which the maximum load pressure PLS is applied. Therefore, both the pressures in the pressure chambers 10 of the directional control valves 5, 6 become equal to each other, resulting in that the flow rates of the hydraulic fluid supplied to the actuators 3, 4 are distributed in accordance with the ratio of opening area between the respective meter-in variable restrictors 15a or 15b.

In addition, the feeder passage 11 of the directional control valve 5, for example, is capable of communicating with the drain chamber 13b via the bleed passage 21. On this occasion, the amount by which the bleed passage 21 is restricted is determined by the variable restrictor 22a when the spool 8 of the directional control valve 5 is being displaced to the right in FIG. 3, and by the variable restrictor 22b when it is being displaced to the left. On the other hand, a load pressure signal is led from the bleed passage 21 to the signal line 18 via the check valve 17 provided in the pressure compensating valve 16. The hydraulic fluid introduced from the pressure chamber 10 to the bleed passage 21 is further introduced to the downstream side of the feeder passage 11 and then to any one of the actuator ports 12a, 12b dependent on the direction of movement of the spool 8, followed by supply to the swing motor 3.

Consider now the case that the directional control valve 5 is operated to drive the swing motor 3 with an intention of driving the swing (not shown) as an inertial body. It is to be noted that the following explanation also holds true for the combined operation of driving the swing motor 3 and the directional control valve 4, because the swing motor is on the higher load side. When the swing motor 3 is driven aiming to drive the swing as an inertial body, the delivery rate of the hydraulic pump 1 is controlled so that the differential pressure between the pressure Pd at the pump port 9 and a pressure P3 in the bleed passage 21, i.e., PLS, is held at a fixed value. At this time, since only the pressure P3 in the bleed passage 21 acts as a back pressure of the pressure compensating valve 16, the pressure loss between the pressure chamber 10 and the bleed passage 21 is produced by only the force of a spring 16a acting on the pressure compensating valve 16, but the value of that force is as small as negligible. In other words, the load sensing differential pressure $\Delta PLS$ $(=Pd-PLS)$ is primarily governed by the pressure loss due to the meter-in variable restrictor 15a or 15b and the delivery rate of the hydraulic pump 1 is proportional to the opening area of the variable restrictor 15a or 15b. The hydraulic fluid delivered from the hydraulic pump 1 is introduced to the bleed passage 21 via the pressure compensating valve 16. Following that, a part of the hydraulic fluid introduced to the bleed passage 21 is led to the drain chamber 13a via the bleed passage 21 and the variable restrictor 22a or 22b and then to the reservoir via the reservoir port 13. The rest of the hydraulic fluid is supplied to the swing motor 3 via the load check valve 23, the feeder passage 11 and the actuator port 12a or 12b as mentioned before. On this occasion, the maximum pressure available in the bleed passage 21, i.e., how far the pressure in the bleed passage 21 is able to increase in units of Kg·f/cm$^2$ with the actuator port 12*a* or 12*b* blocked, is determined by the relationship in balance between the opening area of the meter-in variable restrictor 15*a* or 15*b* and the opening area of the variable restrictor 22*a* or 22*b*.

Thus, when the directional control valve 5 is shifted with an intention of turning the swing as an inertial body, a part of the hydraulic fluid introduced to the bleed passage 21 is led to the reservoir port 13 via the variable restrictor 22*a* or 22*b* to thereby limit a rise in the pressure P2. In addition, the opening area of the variable restrictor 22*a* or 22*b* is changed dependent on the movement of the meter-in variable restrictor 15 to achieve pressure control. When the swing motor 3 starts its rotation and the hydraulic fluid now flows into the swing motor 3 via the actuator port 12*a* or 12*b*, the actuator pressure P2 is reduced and so is the bleed pressure P3, whereby the amount of the hydraulic fluid flowing into the tank port 13 from the bleed passage 21 via the variable restrictor 22*a* or 22*b* is reduced. As a result, the hydraulic fluid can be supplied to the swing motor 3 in such a manner as to prevent an excessive rise in the pressure, and the swing (not shown) can be driven smoothly, allowing the operator to feel no shock. The above operation is not limited to the case of operating the swing motor 3 adapted to drive the swing, and is equally applied to the case of driving the boom and the travel body (not shown).

Even if the delivery rate of the hydraulic pump is fluctuated to some extent during the time in which the above operation is being carried out, a part of the hydraulic fluid is returned to the reservoir via the bleed passage 21 and the variable restrictor 22*a* or 22*b*. Therefore, change in the load sensing pressure incidental to slight fluctuations in the delivery rate is suppressed to prevent the circuit oscillating by such slight fluctuations in the delivery rate.

Further, when the load pressure is changed so as to increase during operation of the swing motor 3, for example, the flow rate of the hydraulic fluid passing through the directional control valve 5 is controlled by the pump flow controller 2 to be kept constant. However, the resulting rise in the load pressure increases the flow rate of the hydraulic fluid returned to the reservoir via the bleed passage 21. Accordingly, the flow rate of the hydraulic fluid supplied to the swing motor 3 is so reduced that the swing motor 3 is stably rotated without causing vibration.

In the structure of the directional control valve with this embodiment, since the meter-in variable restrictors 15*a*, 15*b* and the variable restrictors 22*a*, 22*b* in the bleed passage 21 are formed on the same spool 8, the valve structure is quite simplified, which results in the reduced manufacture cost of the directional control valve.

Figure 5:
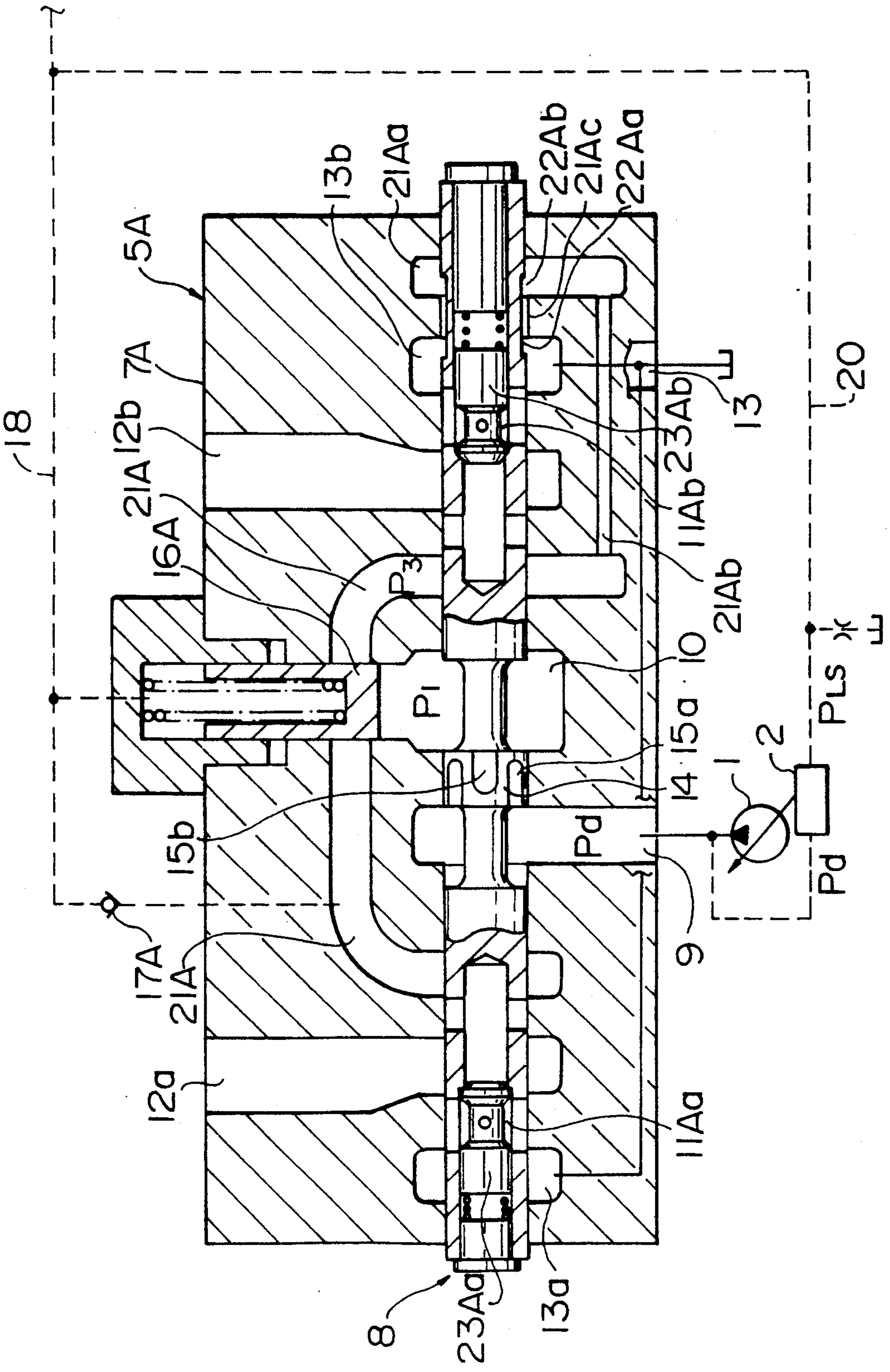
FIG. 5 is a sectional view showing a modification of the valve structure shown in FIG. 3.

A modification of the directional control valve with this embodiment will be described with reference to FIG. 5. In FIG. 5, feeder passages 11A*a*, 11A*b* corresponding to the aforesaid feeder passage 11A shown in FIG. 3 are formed in a spool 8A of a directional control valve 5A, and load check valves 23A*a*, 23A*b* are respectively installed in the feeder passages 11A*a*, 11A*b* to prevent the hydraulic fluid from reversely flowing from pump ports 12*a*, 12*b*. The block 7A has formed therein a bleed passage 21A, a bleed chamber 21A*a* positioned outwardly of the drain chamber 13*b* in the axial direction, a bleed auxiliary passage 21A*b* for communicating between the bleed passage 21A and the bleed chamber 21A*a*, and a bleed auxiliary passage 21A*c* capable of communicating between the bleed chamber 21A*a* and the drain chamber 13*b*. Those passages and the chambers jointly constitute the aforesaid bleed passage 21 shown in FIG. 3. Variable restrictors 22A*a*, 22A*b* are formed in those portions of the spool 8A adjacent to the bleed auxiliary passage 21A*c*. The bleed passage 21A also functions as a part of the feeder passage such that the hydraulic fluid having passed through the pressure compensating valve 16A flows into the feeder passages 11A*a*, 11A*b* via the bleeder passage 21A. Check valve 17A is identical to the aforesaid check valve 17 shown in FIG. 3, but is provided outwardly of the block 7A. The directional control valve 5A thus arranged can also operate in a like manner to the aforesaid directional control valve 5 shown in FIG. 3.

A second embodiment of the present invention will be described with reference to FIGS. 6 and 7.

Figure 6:
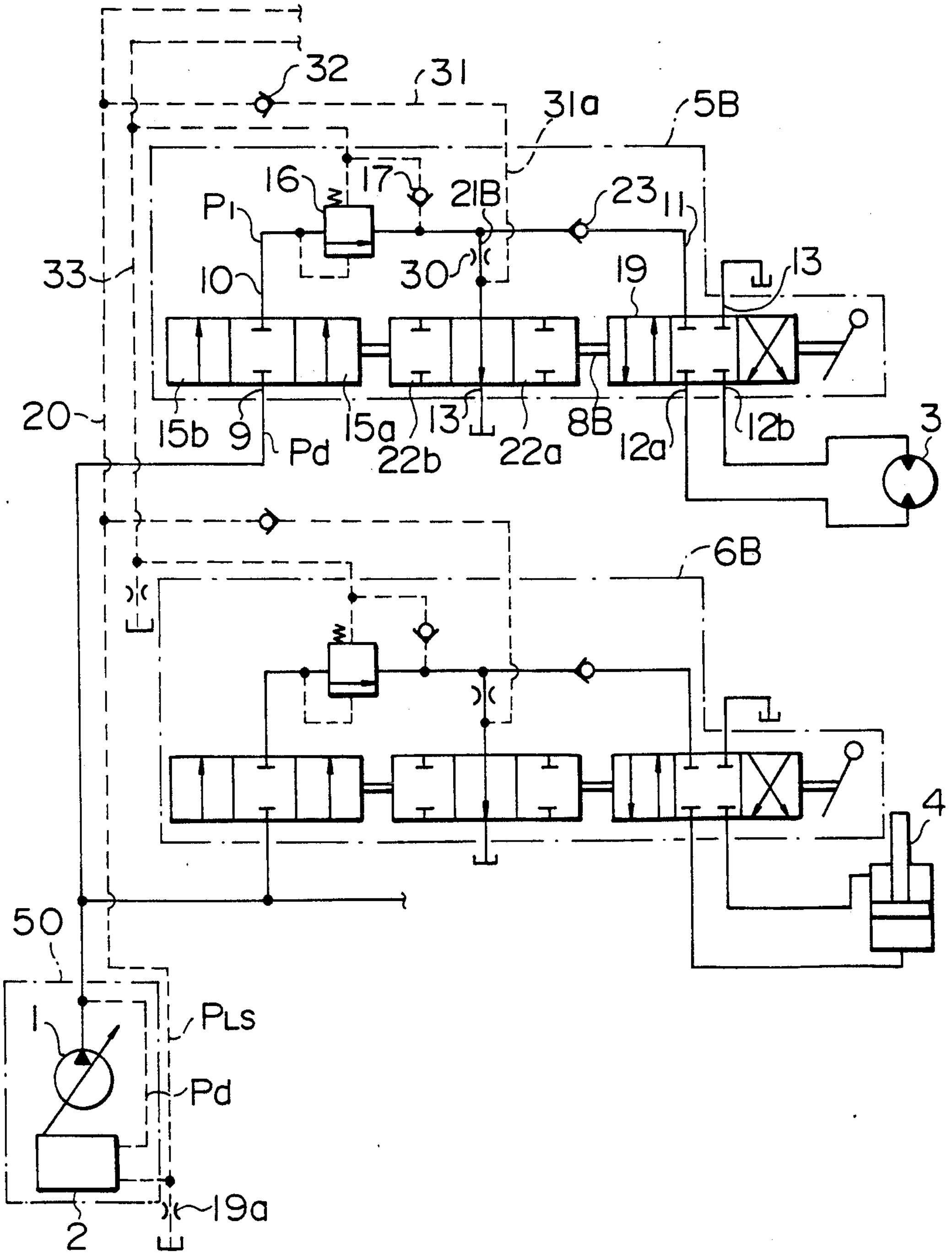
FIG. 6 is a schematic diagram of a hydraulic drive system according to a second embodiment of the present invention.
Figure 7:
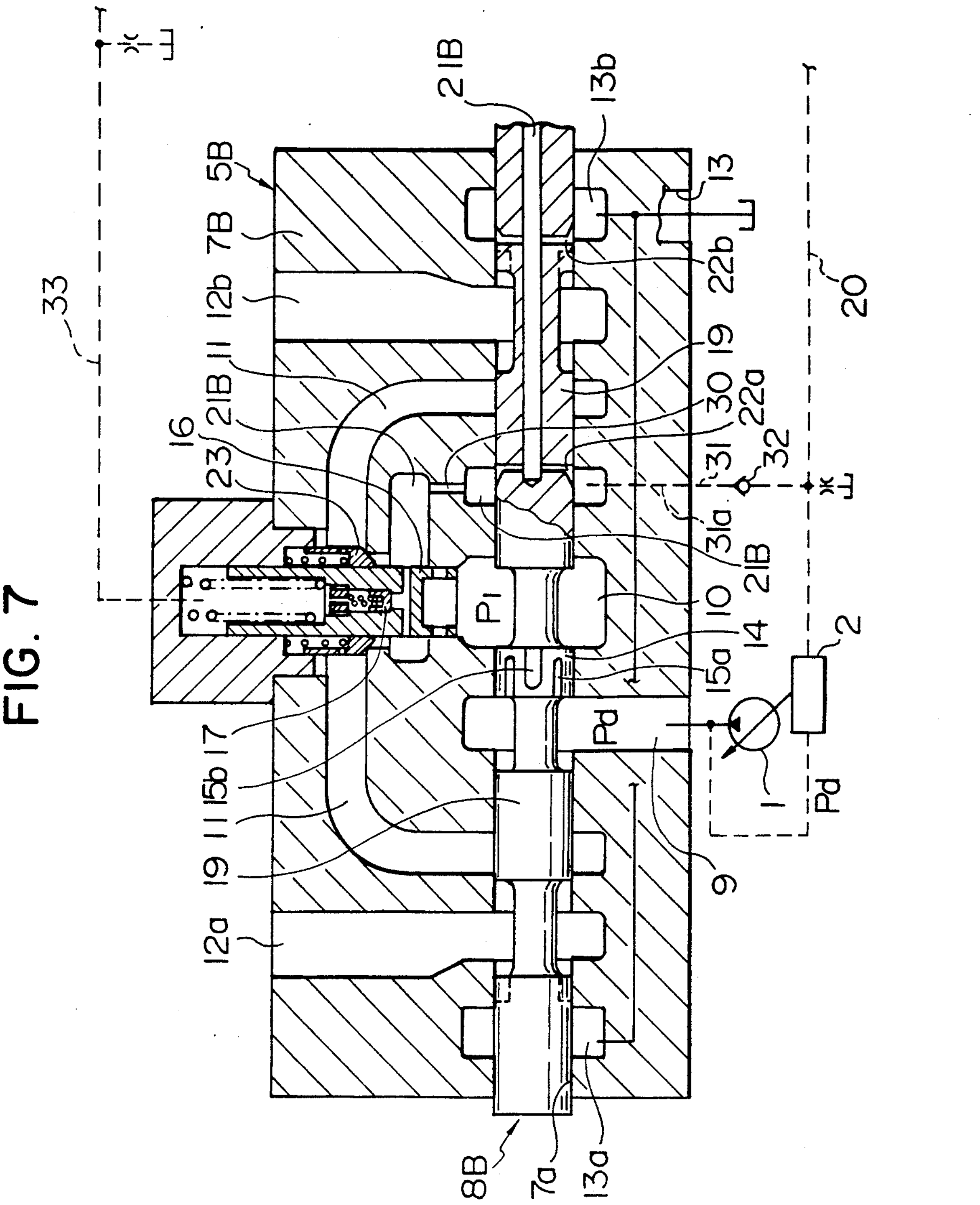
FIG. 7 is a sectional view showing the structure of a directional control valve shown in FIG. 6.

In FIG. 6, a hydraulic drive system of this embodiment includes directional control valves 5B, 6B and other not-shown directional control valves for controlling respective flows of a hydraulic fluid supplied from a hydraulic pump 1 to actuators such as a swing motor 3 and a boom cylinder 4. All of these directional control valves have the same structure. The directional control valve 5B for controlling operation of the swing motor 3, by way of example, comprises a block 7B and a bleed passage 21B formed in a spool 8B, with a fixed restrictor 30 being provided in the bleed passage 21B formed in the block 7B, as shown in FIG. 7. A portion of the bleed passage 21B downstream of the fixed restrictor 30 is communicated with an external signal line 31 via a signal passage 31*a*, and the signal line 31 is connected to a common signal line 20 via a check valve 32. Thus, in this embodiment, the pressure in the bleed passage 21B downstream of the fixed restrictor 30 is applied as the load sensing pressure to the pump controller 2.

On the other hand, the feeder passage 11 is connected to an external common signal line 33 via a check valve 17, and a maximum load pressure PLmax among the plurality of actuators, led to the signal line 33, is applied to one end of a pressure compensating valve 16. Thereby, as with the above first embodiment, the flow rates of the hydraulic fluid supplied to the swing motor 3 and the boom cylinder 4 are distributed in accordance with the ratio of opening area between respective meter-in variable restrictors 15*a* or 15*b*.

With this embodiment thus arrangement, like the above first embodiment, it is possible to distribute the flow rates of the hydraulic fluid supplied to the respective actuators 3, 4 in accordance with the ratio of opening area between the corresponding variable restrictors for effecting the smooth combined operation, suppress a rise in the load pressure when the swing motor 3 is driven, to prevent abrupt operation of the swing motor 3 for ensuring smooth driving of the swing, and suppress change in the load sensing pressure under an action of the bleed passage 21B even if the delivery rate from the hydraulic pump 1 is fluctuated to some extent, thereby preventing the occurrence of oscillation in the circuit.

Additionally, when the load pressure of the actuator, for example, the swing motor 3, is changed so as to increase in this embodiment, the flow rate of the hydraulic fluid passing through the fixed restrictor 30 provided in the bleed passage 21B is increased and thus the pressure drop across the fixed restrictor 30 is enlarged. On the other hand, the pump controller 2 controls the delivery rate of the hydraulic pump 1 so that the delivery pressure of the hydraulic pump 1 is held higher by a fixed value than the pressure P2 residing between the variable restrictor 22*a* or 22*b* and the fixed restrictor 30 in the bleed passage 21B. Therefore, as the load pressure increases, the differential pressure across the meter-in variable restrictor 15*a* or 15*b* is reduced and so is the flow rate of the hydraulic fluid passing through the directional control valve 5B. Consequently, with not only an increase in the flow rate of the hydraulic fluid returned to the reservoir via the bleed passage 21B as set forth above in connection with the first embodiment, but also a decrease in the flow rate of the hydraulic fluid passing through the directional control valve 5B, the flow rate of the hydraulic fluid supplied to the swing motor 3 is reduced so that the vibration of the actuator is damped.

In addition, this embodiment is further advantageous in making the energy loss smaller because the provision of the fixed restrictor 30 results in the reduced flow rate of the hydraulic fluid to be returned to the reservoir via the bleed passage 21B.

Figure 8:
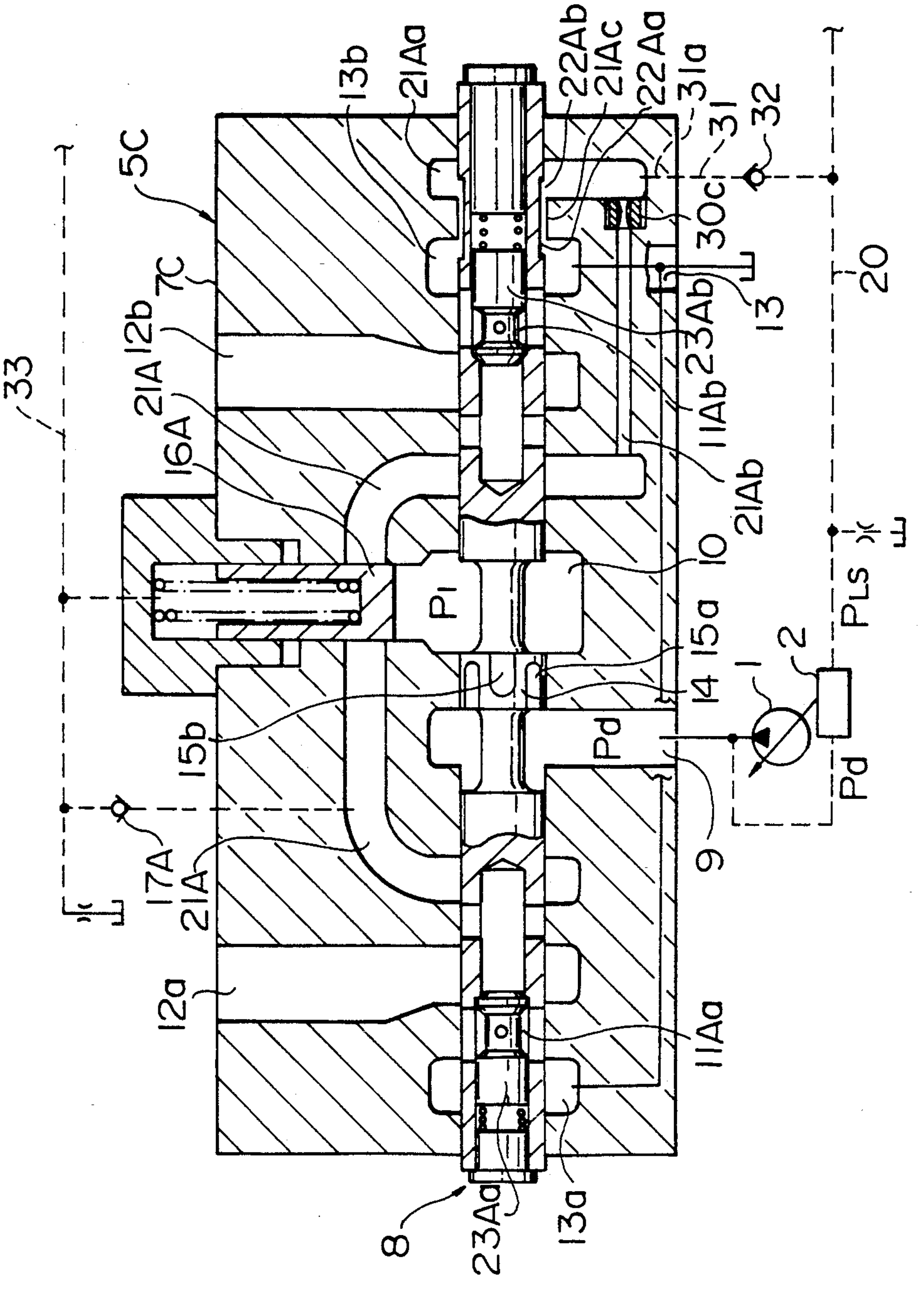
FIG. 8 is a sectional view showing a modification of the valve structure shown in FIG. 7.

A modification of the directional control valve in the above second embodiment will be explained by referring to FIG. 8. This modification is obtained by applying the concept of the second embodiment to the valve structure shown in FIG. 5. More specifically, a restrictor 30C is disposed in the bleed auxiliary passage 21Ab, the bleed chamber 21Aa is communicated with an external signal line 31 via a signal passage 31*a*, and the signal line 31 is connected to the common signal line 20 via a check valve 32. The bleed passage 21A serving also as a part of the feeder passage is connected to a common signal line 33 via the external check valve 17A. The directional control valve of this modification can also operate in a like manner to the aforesaid directional control valve 5B shown in FIG. 7.

INDUSTRIAL APPLICABILITY

With the arrangement explained above, the hydraulic drive system for construction machines of the present invention can realize pressure control while maintaining adequate distribution of flow rates, to thereby smoothly drive an inertial body and make the operator free from any shock, and can suppress change in the load sensing pressure incidental to fluctuations in the pump delivery rate, thereby preventing the circuit from oscillating by such fluctuations in the pump delivery rate. Moreover, even when the load pressure is changed so as to increase during operation of an actuator, vibration produced in the circuit can be damped with the result of the improved working efficiency.

We claim:

1. A hydraulic drive system for a construction machine comprising hydraulic pressure supply means; a plurality of actuators driven by a hydraulic fluid supplied from said hydraulic pressure supply means; and a plurality of directional control valves respectively disposed between said hydraulic pressure supply means and said plurality of actuators, and each comprising a pump port, a pressure chamber capable of communicating with said pump port, a feeder passage capable of communicating with said pressure chamber, actuator ports capable of communicating with said feeder passage, a reservoir port capable of communicating with said actuator ports, first meter-in variable restrictors disposed between said pump port and said pressure chamber, and a pressure compensating valve disposed between said pressure chamber and said feeder passage and having a pair of opposite ends, one of which is subjected to a pressure in said pressure chamber and the other of which is subjected to a maximum load pressure among said plurality of actuators, said hydraulic pressure supply means having a hydraulic pump and pump flow control means for controlling a delivery rate of said hydraulic pump so that a delivery pressure of said hydraulic pump is held higher by a predetermined value than the maximum pressure obtained, as a load sensing pressure, from load pressures of said plurality of actuators, wherein:

at least one of said plurality of directional control valves has a bleed passage for communicating between said feeder passage and said reservoir port, and second variable restrictors disposed in said bleed passage and moved in conjunction with said first meter-in variable restrictors and being kept open after displacement of the corresponding directional control valve from a substantially neutral position and after said first meter-in variable restrictors are opened.

2. A hydraulic drive system according to claim 1, wherein said second variable restrictors are set such that opening areas thereof become smaller as opening areas of said first variable restrictors increase.

3. A hydraulic drive system according to claim 1, wherein said directional control valve further comprises a third restrictor disposed in a portion of said bleed passage between said feeder passage and said second variable restrictors, and a signal passage for introducing, as said load sensing pressure, a pressure residing in a portion of said bleed passage between said second variable restrictors and said third restrictor.

4. A hydraulic drive system according to claim 3, wherein said directional control valve further comprises a load check valve disposed between a connection point of said feeder passage to said bleed passage and said actuator ports.

5. A hydraulic drive system according to claim 3, wherein said directional control valve has a spool movable through a stroke dependent on an operation amount, and said first and second variable restrictors are formed on said the same spool.

6. A hydraulic drive system according to claim 1, wherein said directional control valve further comprises a load check valve disposed between a connection point of said feeder passage to said bleed passage and said actuator ports.

7. A hydraulic drive system according to claim 1, wherein said directional control valve has a spool movable through a stroke dependent on an operation amount, and said first and second variable restrictors are formed on said the same spool.

8. A directional control valves comprising a pump port, a pressure chamber capable of communicating with said pump port, a feeder passage capable of communicating with said pressure chamber, actuator ports capable of communicating with said feeder passage, a reservoir port capable of communicating with said actuator ports, first meter-in variable restrictors disposed between said pump port and said pressure chamber, and a pressure compensating valve disposed between said pressure chamber and said feeder passage and having a pair of opposite ends, one of which is subjected to a pressure in said pressure chamber and the other of which is subjected to a maximum load pressure among a plurality of actuators, wherein:

said directional control valve further comprises a bleed passage for communicating between said feeder passage and said reservoir port, and second variable restrictors disposed in said bleed passage and moved in conjunction with said first meter-in variable restrictors and being kept open after displacement of the corresponding directional control valve from a substantially neutral position and after said first meter-in variable restrictors are opened.

9. A directional control valve according to claim 8, wherein said directional control valve has a spool movable through a stroke dependent on an operation amount, and said first and second variable restrictors are formed on said the same spool.

10. A directional control valve according to claim 8, wherein said second variable restrictors are set such that opening areas thereof become smaller as opening areas of said first variable restrictors increase.

11. A directional control valve according to claim 8, wherein said directional control valve further comprises a third restrictor disposed in a portion of said bleed passage between said feeder passage and said second variable restrictors, and a signal passage for introducing, as a load sensing pressure, a pressure residing in a portion of said bleed passage between said second variable restrictors and said third restrictor.

12. A directional control valve according to claim 8, wherein said directional control valve has a spool movable through a stroke dependent on an operation amount, and said first and second variable restrictors are formed on said the same spool.

* * * * *